United States Patent Office 3,574,698
Patented Apr. 13, 1971

3,574,698
PREPARATION OF SALTS OF 2-MERCAPTOETHYL-
AMINES AND THEIR S-ACYL ANALOGS
Stanley J. Brois, Cranford, and Harry W. Barnum, Elizabeth, N.J., assignors to Esso Research and Engineering Company
No Drawing. Filed July 19, 1967, Ser. No. 654,368
Int. Cl. C07c 153/07
U.S. Cl. 260—455
10 Claims

ABSTRACT OF THE DISCLOSURE

S-acyl-2-mercaptoethylamine salts are formed by reacting an aziridine compound with a thiol carboxylic acid and a strong acid at low temperatures. Preferably, the reaction is conducted in the presence of a polar organic diluent. Salts of the 2-mercaptoethylamines can be prepared from their S-acyl analogs through the use of an alcoholysis or hydrolysis reaction.

BACKGROUND OF THE INVENTION

The present invention is directed to a new method for the formation of 2-mercaptoethylamine salts and their S-acyl derivatives. More particularly, the invention is directed to a one step process for the formation of S-acyl-2-mercaptoethylamine salts and to the formation of 2-mercaptoethylamine salts from the S-acyl analogs.

Conventional synthetic routes to 2-mercaptoethylamine salts involve (1) reacting ethylenimines with excess hydrogen sulfide to obtain β-mercaptoethylamines (cysteamines) in 70–80% yields and (2) reacting the cysteamines with acids such as p-toluenesulfonic acid, hydrochloric acid or sulfuric acid, etc. to obtain the desired salt. This approach is not a practical commercial route to high purity mercaptoethylamine salts since the first stage amine reaction product is not always uniformally isolable for salt formation. Only those mercaptoethylamine products which can be distilled under vacuum conditions can be converted to salts of analytical purity. Hence, the prior route to the desired salts was primarily limited to the preparation of mercaptoethylamine derivatives of sufficiently low molecular weight where distillation purification techniques were possible. Attempts to convert the initially formed undistilled amino mercaptans to the corresponding salts without prior clean-up of the first stage product by distillation were not successful. Usually the initial reaction product was always more or less contaminated with higher molecular weight and less soluble by-products.

Previous synthetic routes (Wieland and Bokelman, Ann. Chem., 576, 20 (1952); Foye, Duvall, and Mickles, J. Pharm. Sci., 51, 168 (1962)) to S-acyl-2-mercaptoethylamine salts have also not been entirely satisfactory. The normal route to the S-acyl derivatives involves a heterogeneous reaction between mercaptoethylamine hydrochloride and acyl chloride at temperatures of 50 to 170° C. Difficulties have been experienced in finding a suitable solvent for both the mercaptoethylamine hydrochloride and the selected acyl chloride. Additionally, the products of the synthesis have been restricted to the chloride salts.

Now, in accordance with the present invention, it has been found that high purity mercaptoethylamine salts of various types and their S-acyl derivatives can be prepared in high yields by employing the process sequence of the present invention. The processing sequence involves first forming an S-acyl-2-mercaptoethylamine salt and thereafter, if desired, converting this material to the 2-mercaptoethylamine salt. The S-acyl-2-mercaptoethylamine salt is formed by reacting an aziridine compound with a thiol carboxylic acid and a strong acid at low temperatures. Desirably, the reaction is conducted in the presence of a polar diluent. The free mercaptoethylamine salt is secured by reacting the S-acyl analog previously formed with water or an organic alcohol at elevated temperatures.

According to the preferred processing sequence, an aziridine compound is reacted with a thiol carboxylic acid in the presence of a strong acid at low temperatures to arrive at the S-acyl derivatives of 2-mercaptoethylamine salts. Useful aziridine compounds (ethylenimine and ethylenimine derivatives) include those compounds having the following general formula:

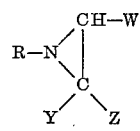

wherein R is a hydrogen radical or an organic radical having from 1 to 18 carbon atoms, preferably (1) a straight or branched chain alkyl radical having from 1 to 18 carbon atoms; (2) a cycloalkyl radical having 5 to 8 carbon atoms; (3) a substituted or unsubstituted aryl radical having from 6 to 12 carbon atoms; or (4) an aralkyl having from 7 to 12 carbon atoms; and W, Y and Z are hydrogens or organic radicals having from 1 to 18 carbon atoms and may be the same or different moieties. Preferably, W, Y and Z are either (1) hydrogen radicals; (2) alkyl radicals, having from 1 to 12 carbon atoms; or (3) substituted or unsubstituted aryl radicals having from 6 to 12 carbon atoms.

Representative, non-limiting examples of suitable aziridine compounds include:

ethylenimine,
1-methylaziridine,
1-ethylaziridine,
1-isopropylaziridine,
1-n-butylaziridine,
1-t-butylaziridine,
1-octylaziridine,
1-dodecylaziridine,
1-hexadecylaziridine,
1-octadecylaziridine,
2-methylaziridine,
2-ethylaziridine,
2-butylaziridine,
2-octylaziridine,
2-dodecylaziridine, 2-octadecylaziridine,
2,2-dimethylaziridine,
2,3-dimethylaziridine,
1-ethyl-2,3-dimethylarizidine,
2,2,3-trimethylaziridine,
1-cyclohexylaziridine,
1-benzylaziridine,
2-benzylaziridine,
1-phenylaziridine,
2-phenylaziridine,
2-phenyl-3-methylaziridine,
2-phenyl-3,3-dimethylarizidine and the like.

Thiolcarboxylic acids suitable for use in the present invention may be represented by the following formula:

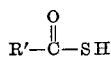

wherein R′ is a hydrocarbon radical having from 1 to 18 carbon atoms. Preferably, R′ is a straight or branched chain alkyl radical having from 1 to 12 carbon atoms, a cycloalkyl radical having from 5 to 12 carbon atoms, an aralkyl radical having from 7 to 18 carbon atoms, and substituted and unsubstituted aryl radical having from 6 to 12 carbon atoms. Examples of suitable thioacids include thiolacetic, thiolpropionic, thiolbutyric, thiol-octanoic, thiololeic, α-aminothiolacetic, α-aminothiol-propionic, thiolfuroic, thiolbenzoic, thioltoulic, thiol-naphthoic and thiolphthalic acid.

Strong acids (HX) employable in the process of the present invention include but are not limited to sulfuric acid, methane sulfonic acid, p-toluenesulfonic acid, phosphoric acid, nitric acid, and perchloric acid. The use of the strong acid reactant is an essential feature of the instant process. The strong acid plays a dual role in the process as it effectively protonates the aziridine reactant thereby enhancing the reactivity of the aziridine and also lessens the tendency of the aziridine to undergo polymerization. The strong acid also prevents the S-acyl salt formed in the first processing step from rearranging, via transacetylation, to the corresponding 2-acylaminoethylmercaptan. Desirably, the strong acid used should be less nucleophilic than the thiolcarboxylic acid reagent employed so that the strong acid does not compete with the thiol acid in the ring opening process.

As noted earlier, an organic alcohol or water is employed to convert the S-acyl-2-mercaptoethylamine salts to the free 2-mercaptoethylamine salts. Suitable alcohols have the general formula:

R″—OH wherein R″ is an aliphatic radical having 1 to 12 carbon atoms, preferably an unsubstituted or substituted alkyl radical having from 1 to 12 carbon atoms. Most preferably, R″ is an unsubstituted lower alkyl radical having from 1 to 6 carbon atoms. Examples of useful compositions include methanol, ethanol, isopropanol, isobutanol, n-butanol, 2-methoxy-ethanol and the like.

The reactions contemplated by this invention may be represented by the following generalized equations:

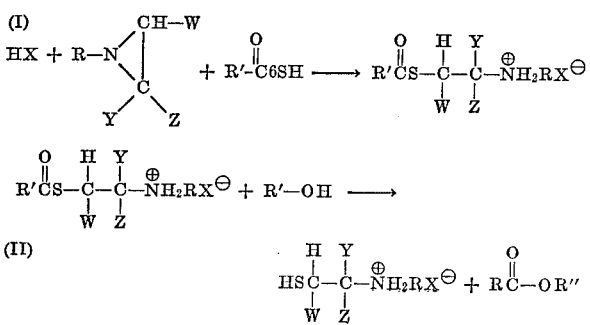

Equation I designates the general process employed to arrive at S-acyl-2-mercaptoethylamine salts. Equation II illustrates the alcoholysis reaction employed to convert the S-acyl analog to the free 2-mercaptoethylamine salt.

It is desirable that the reaction be conducted in the presence of a solvent or a solvent mixture. The preferred solvents are polar materials in particular, polar organic materials such as lower alcohols and ketones and mixtures thereof. Generally, homogenous reactions and facile product recovery can be secured with any of the following solvents or solvent combinations: methanol, ethanol, isopropanol, methanol-ether, isopropanol-ether, acetone, acetonitrile, N,N-dimethylformamide (DMF), dimethylsulfoxide (DMSO), acetic acid, methanol-water, methanol-acetone, isopropanol-water, DMF-methanol, DMSO-methanol, tetrahydrofuran (THF), THF-methanol, and the like. In the reaction for the formation of the S-acyl analog products, from 1 to 20 volumes, preferably 2 to 5 volumes of solvent or solvent mixture are employed per volume of aziridine, thiolcarboxylic acid and strong acid reagents.

The conversion of the S-acyl analogs to the free mercaptoethylamine salts employing hydrolysis or alcoholysis techniques may be conducted in the presence or absence of an additional solvent. If desired, the S-acyl analog can be recovered from the diluent employed during the formation reaction and the product admixed with water or the necessary alcohol. Alternatively, water or the alcohol can be added directly to the crude reaction mixture containing the S-acyl analog. Most simply, where a suitable alcohol is employed as the diluent in the reaction for the formation of the S-acyl analog, the crude reaction mixture may be simply heated to a desired temperature to complete the alcoholysis reaction.

The temperatures employed during the reaction for the formation of the S-acyl-2-mercaptoethylamine salts normally vary in the range from about −70 to 0° C., preferably −30 to −10° C. The temperatures employed in subsequent hydrolysis or alcoholysis reactions for the conversion of the S-acyl analogs to the corresponding amine salts normally range from 25 to 110° C., preferably 60 to 100° C. Ordinarily, in the alcoholysis reaction, the total mixture is maintained at the reflux temperature of the mixture for a time sufficient to convert substantially all of the S-acyl analog to the desired product. The pressure employed within the reaction zone during the formation of the S-acyl derivatives can vary from 1 to 10 atmospheres. The pressures used during the second stage alcoholysis or hydrolysis reaction can likewise vary from 1 to 10 atmospheres. The reaction periods utilized in the formation of the S-acyl analogs can vary over a wide range; however, substantial yields of S-acyl-2-mercaptoethylamine salts are secured within the temperature and pressure limit set forth above within from 0.5 to 24 hours, normally 1 to 4 hours. As noted earlier, the alcoholysis or hydrolysis reactions are conventionally conducted for a time sufficient to convert substantially all of the S-acyl analog to the desired product. This period normally varies from 1 to 24 hours.

The reactions contemplated by the instant invention (Equations I and II) are not critically sensitive to the amounts of reagents employed in the processes. Generally a 1:1:1 molar ratio of aziridine, thiol acid, and strong acid is employed in the reaction for the formation of S-acyl-2-mercaptoethylamine salts. No particular advantage is achieved in employing reactant ratios other than 1:1:1; however, other ratios can be utilized. Large excesses of either water or alcohol are normally used in the second stage hydrolysis or alcoholysis reactions. From 1 to 100 moles of water or alcohol may be used per mole of S-acyl analog.

The reaction vessels used for the first stage reaction (Equation I) and the second stage hydrolysis or alcoholysis reaction (Equation II) may be constructed of any material that is inert to the reactants and is capable of withstanding the operating temperatures and pressures. Reaction vessels formed of stainless steel or glass-lined steel are satisfactory.

In general, the process employed for the formation of the S-acyl derivatives involves the gradual addition of the aziridine compound, diluted in a suitable solvent, to a solution containing equivalent amounts of the thiolcarboxylic acid and the strong, poorly nucleophilic acid at a temperature of about —30° C. If substantial yields of the desired product are to be secured, it is highly desirable that the aziridine be slowly introduced to the thiolcarboxylic acid-strong acid system. Deviation from this mode of introduction, i.e. aziridine added slowly to other reactants, can result in seriously diminished yields. After addition of the aziridine compound is complete the total reaction mixture is permitted to warm to about 25° C. As the mixture is brought to about 25° C., the S-acyl-2-mercaptoethylamine salt product may precipitate from solution. Quantitative recovery of the S-acyl-2-mercaptoethylamine salt is usually assured by adding an excess of ether or other suitable solvents to the reaction mixture. The product may be recrystallized from a suitable solvent, washed, and dried under vacuum conditions. If it is desired that the S-acyl-2-mercaptoethylamine salt be converted to the free mercaptoethylamine salt, the S-acyl analog either in an isolated or unisolated state is refluxed with a lower alkyl alcohol or water until conversion is completed as determined by periodic infrared analysis of the reaction mixture.

The products produced with the processes of the present invention have utility as intermediates for the synthesis of other chemical compounds. For example, the S-acyl derivatives of mercaptoethylamine salts are readily transformed to the corresponding β - acylaminoethanethiols via base treatment. Additionally, mercaptoethylamine salts and their S-acyl analogs can be used as chelating agents in the purification of metals. Lastly, these materials are employed in the synthesis of antiradiation and antiarthritis agents.

The invention will be further understood by reference to the following examples.

Example I

To a four-necked, one liter round bottom flask equipped with a mechanical stirrer, addition funnel, thermometer and condenser was added, under a nitrogen atmosphere, 0.5 mole (95.1 grams) of p-toluenesulfonic acid monohydrate contained in 300 milliliters of methanol. The stirred solution was chilled to —20° C. and 0.5 mole (38.06 grams) of thiolacetic acid contained in 200 milliliters of methanol was added dropwise. After acid addition, 0.5 mole (21.54 grams) of ethylenimine in 200 milliliters of methanol was added dropwise. During aziridine addition, the reaction system was maintained at a temperature of between about —20 and —30° C. After the aziridine addition, the reaction mixture was permitted to warm to room temperature. Thereafter, the warm mixture was stirred at room temperature for one hour and cooled in a Dry Ice-acetone bath. A solid product separated from solution. Approximately 26 grams of the precipitated product was isolated by filtration. A second crop, amounting to 104 grams of product was secured when the filtrate was diluted with ether, cooled and filtered. The two crops together comprised a 90% yield based on ethylenimine or thio acid. Both crops were readily recrystallized from isopropanol and exhibited identical melting points, infrared and NMR spectra. After two recrystallizations from isopropanol, the product melted at 104–105° C. The infrared spectrum (Nujol mull) exhibited a carbonyl absorption band at 5.97 microns. The product, 2-thiolacetylethylammonium tosylate, which has a general formula $C_{11}H_{17}O_4NS_2$ was subjected to a carbon, hydrogen, nitrogen analysis and was found to contain 45.16 wt. percent carbon, 5.8 wt. percent hydrogen, and 22.14 wt. percent nitrogen. The product theoretically should contain 45.34 wt. percent carbon, 5.88 wt. percent hydrogen, and 22.01 wt. percent nitrogen.

Example II

Into a one liter round bottom flask equipped with a mechanical stirrer, dropping funnel, thermometer and condenser, was added 0.25 mole of sulfuric acid contained in 300 milliliters of methanol. This stirred solution was cooled to —30° C. and 0.5 mole of thiolacetic acid in 200 milliliters of methanol was charged dropwise. Thereafter, ethylenimine (0.5 mole) was added to the solution dropwise at —30° C. Upon completion of the aziridine addition, the cooling bath was removed and the reaction mixture permitted to warm to ambient temperature. Ether was then added to the mixture until the solution became cloudy. Upon cooling the total mixture to —40° C., a voluminous precipitate formed. The precipitate was isolated by filtration and washed three times with ether. The dried product, recrystallized from methanol (M.P. 113–115° C.) weighed 64 grams. Its infrared spectrum exhibited a characteristic carbonyl adsorption band at 5.94 microns. The proton spectrum consisted of three signals at 5.22, 6.75 and 7.57τ with relative intensities of 3:4:3. These signals are ascribable to the

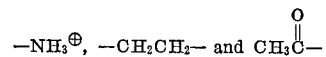

protons, respectively.

The product, 2-thiolacetylethylammonium sulfate, was subjected to carbon, hydrogen, sulfur, and oxygen analysis and was found to contain 28.40 wt. percent carbon, 5.95 wt. percent hydrogen, 28.62 wt. percent sulfur, and 28.98 wt. percent oxygen. The product, having a general formula $C_8H_{20}N_2O_6S_3$, should contain 28.56 wt. percent carbon, 5.99 wt. percent hydrogen, 28.59 wt. percent sulfur and 28.53 wt. percent oxygen.

Example III

Following the procedure of Examples I and II, 0.5 mole ethylenimine contained in 200 milliliters of methanol was added dropwise to 500 milliliters of methanol containing 0.5 mole of thiolacetic acid and 0.5 mole of nitric acid at —30° C. When the aziridine addition was complete, the resulting homogeneous solution was allowed to warm to room temperature. At this point, ether was added to the solution until the solution became cloudy. A voluminous precipitate formed on cooling the total mixture in a Dry Ice-acetone bath. The precipitate product was isolated by filtration and washed several times with ether. The purified product, recrystallized from isopropanol in 83% yield, melted at 58–60° C.

The product, 2-thiolacetylethylammonium nitrate, was subjected to a carbon, hydrogen, sulfur analysis and was found to contain 26.23 wt. percent carbon, 5.51 wt. percent hydrogen, and 17.34 wt. percent sulfur. The product, which has a general formula $C_4H_{10}N_2O_4S$, should contain 26.37 wt. percent carbon, 5.53 wt. percent hydrogen, and 17.60 wt. percent sulfur.

Example IV

Following the procedures of the previous examples, a series of alkyl, cycloalkyl and aryl substituted S-acetyl-2-mercaptoethylamine salts were prepared. Some of the compounds thus obtained as well as their physical properties are set forth in Table I hereafter.

TABLE I.—S-ACETYL-2-MERCAPTOETHYLAMINE SALTS [1]

| Salt | M.P., °C. | Theory C | Theory H | Theory S | Found C | Found H | Found S |
|---|---|---|---|---|---|---|---|
| CH₃C(O)S CH₂CH₂N⁺H₂CH₃ Tos⁻ [2] | 103–131 | 47.19 | 6.27 | 21.00 | 47.05 | 6.12 | 21.02 |
| CH₃C(O)S CH₂CH₂N⁺H₂CH₂CH₃ Tos⁻ | 99–101 | 48.88 | 6.63 | 20.07 | 49.25 | 7.03 | 20.05 |
| CH₃C(O)S CH₂C(CH₃)₂—N⁺H₃ Tos⁻ | 165–166 | 48.88 | 6.63 | 20.07 | 48.77 | 6.35 | 20.18 |
| CH₃C(O)S CH₂CH₂N⁺H₂CH₂CH₂C(O)NH₂ Tos⁻ | 116–118 | 46.39 | 6.12 | 17.69 | 46.29 | 6.10 | 17.43 |
| CH₃C(O)S CH₂CH₂N⁺H₂(CH₂)₄N⁺H₃ SO₄²⁻ | 105–107 | 33.32 | 6.99 | 22.24 | 33.58 | 7.55 | 22.08 |
| CH₃C(O)S CH₂CH₂N⁺H₂–Adamantyl, Tos⁻ [3] | 197–198 | 59.26 | 7.34 | 15.07 | 59.52 | 7.18 | 15.18 |
| CH₃C(O)S CH₂CH₂N⁺H₂CH₂CH₂–C₆H₅ Tos⁻ | 148–150 | 57.69 | 6.37 | 16.21 | 57.97 | 5.97 | 16.22 |

[1] All salts recrystallized from isopropanol.

[2] Tos⁻ = ⁻O₃S—C₆H₄—CH₃

[3] Adamantyl radical.

TABLE II.—S-BENZOYL-2-MERCAPTOETHYLAMINE SALTS

| Salt | M.P., °C. | Theory C | Theory H | Theory S | Found C | Found H | Found S |
|---|---|---|---|---|---|---|---|
| PhC(O)SCH₂CH₂N⁺H₂CH₃ [1] Tos⁻ [2] | 89–91 | 55.56 | 5.76 | 17.45 | 55.46 | 5.96 | 17.48 |
| PhC(O)SCH₂C(CH₃)₂—N⁺H₃ Tos⁻ | 152–153 | 56.67 | 6.08 | 16.81 | 56.89 | 6.35 | 16.99 |
| PhC(O)SCH₂CH₂N⁺H₂CH₂CH₂N⁺H₃ SO₄²⁻ | 180–182 | 40.98 | 5.63 | 19.89 | 40.99 | 5.56 | 19.98 |
| PhC(O)SCH₂CH₂N⁺H₂(CH₂)₃N⁺H₃ SO₄²⁻ | 184–186 | 42.84 | 5.99 | 19.06 | 42.82 | 6.01 | 19.12 |
| PhC(O)SCH₂CH₂N⁺H₂(CH₂)₄N⁺H₃ SO₄²⁻ | 186–188 | 44.55 | 6.33 | 18.30 | 44.72 | 6.30 | 18.30 |
| PhC(O)SCH₂CH₂N⁺H₂(CH₂)₆N⁺H₃ SO₄²⁻ | 175–177 | 47.59 | 6.92 | 16.94 | 47.64 | 7.32 | 16.88 |
| PhC(O)SCH(Ph)CH₂N⁺H₃ Tos⁻ | 192–194 | 61.51 | 5.40 | 14.93 | 61.45 | 5.27 | 14.86 |
| PhC(O)SCH₂CH₂N⁺H₂–Adamantyl, Tos⁻ [3] | 210–212 | 64.03 | 6.82 | 13.15 | 64.38 | 6.72 | 13.22 |

[1] Ph designates a phenyl radical.

[2] Tos⁻ = ⁻O₃S—C₆H₄—CH₃

[3] Adamantyl radical.

Example V

Following the experimental procedures of the previous examples, 0.5 mole of ethylenimine dissolved in 200 milliliters of methanol was added dropwise to about 500 milliliters of methanol containing 0.5 mole of thiolbenzoic acid and 0.5 mole of p-toluenesulfonic acid monohydrate at a temperature of about −30° C. The reaction temperature was maintained at −30° C. until the aziridine addition was complete. As the reaction mixture was permitted to warm to room temperature, the product separated from solution as a voluminous precipitate. Thereafter, the mixture was cooled to −20° C., filtered and the filter-cake was washed three times with ether. The product, obtained in 93% yield, melted at 144–145° C. The infrared spectrum of the S-benzoyl-2-mercaptoethylamine tosylate product exhibited a carbonyl absorption band at 6.05 microns. The product, having a general formula $$C_{16}H_{19}NO_4S_2$$

was subjected to a carbon, hydrogen, sulfur analysis and was found to contain 54.30 wt. percent carbon, 5.39 wt. percent hydrogen and 18.19 wt. percent sulfur. The composition should theoretically contain 54.37 wt. percent carbon, 5.42 wt. percent hydrogen and 18.14 wt. percent sulfur.

Example VI

Following the procedure of the previous examples, a number of high purity alkyl, aryl and cycloalkyl analogs of S-aroyl-2-mercaptoethylamine salts were prepared. A listing of the compositions obtained and some of their physical properties are set forth in Table II hereafter.

Example VII

To demonstrate the preparation of analytically pure 2-mercaptoethylamine salts, an S-acetyl-2-mercaptoethylamine salt was subjected to alcoholysis. Accordingly, S-acetyl-2-mercaptoethylamine tosylate (0.1 mole) was dissolved in 300 milliliters of ethanol contained in a 2-necked round bottom flask equipped with condenser and stirrer. The solution was then refluxed for eight hours under a nitrogen atmosphere. The esterolysis reaction was completed as indicated by the disappearance of the carbonyl absorption band at 5.9 microns in the infrared spectrum of the concentrated reaction mixture. Upon cooling of the reaction mixture, the desired product separated from solution. A quantitative yield of analytically pure 2-mercaptoethylamine tosylate was thus obtained. The product melted at 166–167° C. The infrared and NMR spectra of the product were in complete agreement with the proposed product structure.

The product was subjected to a carbon, hydrogen, sulfur analysis and was found to contain 43.52 wt. percent carbon, 6.05 wt. percent hydrogen and 25.60 wt. percent sulfur. The product, which has a general formula $$C_9H_{15}NO_3S_2$$

should contain 43.35 wt. percent carbon, 6.06 wt. percent hydrogen, and 25.72 wt. percent sulfur.

Example VIII

Following the procedure of Example VII, ethanolysis of 10 grams of S-acetyl-2-mercaptoethylamine sulfate contained in 200 milliliters of refluxing ethanol afforded a quantitative yield of 2-mercaptoethylamine sulfate having a melting point of 283° C. The spectral and analytical data were completely consistent with the proposed product structure. The product was also found to contain 18.95 wt. percent carbon, 6.00 wt. percent hydrogen, and 37.71 wt. percent sulfur. The product, which has a general formula $C_4H_{16}N_2O_4S_3$, should contain 19.03 wt. percent carbon, 6.30 wt. percent hydrogen, and 38.12 wt. percent sulfur.

What is claimed is:

1. A process for the formation of S-acyl-2-mercaptoethylamine salts which comprises reacting an aziridine compound having the general formula:

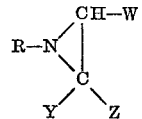

wherein R is selected from the group consisting of hydrogen, straight and branched chain alkyl radicals having from 1 to 18 carbon atoms, a cycloalkyl radical having from 5 to 8 carbon atoms, hydrocarbyl aryl radicals having from 6 to 12 carbon atoms, hydrocarbyl aralkyl radicals having from 7 to 12 carbon atoms, aminoalkyl radicals having from 1 to 18 carbon atoms and carboxamidoalkyl radicals having from 1 to 18 carbon atoms, and W, Y and Z are each selected from the group consisting of hydrogen, an alkyl radical having from 1 to 12 carbon atoms, and hydrocarbyl aryl radicals having from 6 to 12 carbon atoms, with a strong acid and thiolcarboxylic acid having the general formula:

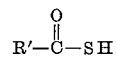

wherein R' is selected from the group consisting of straight or branched chain alkyl radicals having from 1 to 12 carbon atoms, a cycloalkyl radical having from 5 to 12 carbon atoms, a hydrocarbyl aralkyl radical having from 7 to 18 carbon atoms and hydrocarbyl aryl radicals having from 6 to 12 carbon atoms, said reaction conducted in a polar solvent at a temperature varying from about −70° to 0° C. for a time sufficient to obtain a yield of said S-acyl-2-mercaptoethylamine salts.

2. The process of claim 1 wherein (a) R is selected from the group consisting of (1) hydrogen, (2) straight and branched chain alkyl radicals having from 1 to 18 carbon atoms, (3) a cycloalkyl radical having from 5 to 8 carbon atoms, (4) hydrocarbyl aryl radicals having from 6 to 12 carbon atoms, and (5) a hydrocarbyl aralkyl radical having from 7 to 12 carbon atoms, and (b) W, Y and Z are each selected from the group consisting of (1) hydrogen, (2) an alkyl radical having from 1 to 12 carbon atoms, and (3) hydrocarbyl aryl radicals having from 6 to 12 carbon atoms.

3. The process of claim 1 wherein the reaction is conducted at temperatures varying from −30 to −10° C.

4. The process of claim 3 wherein the reaction is conducted by adding the aziridine compound to the thiolcarboxylic acid and strong acid reagents.

5. The process of claim 1 wherein R is hydrogen.

6. The process of claim 1 wherein W, Y and Z are hydrogen.

7. The process of claim 1 wherein said strong acid is less nucleophilic than said thiolcarboxylic acid.

8. The process of claim 7 wherein R' is selected from the group consisting of phenyl radicals and alkyl radicals having from 1 to 12 carbon atoms and W, Y and Z are each selected from the group consisting of hydrogen, phenyl radicals, and alkyl radicals having from 1 to 12 carbon atoms.

9. The process of claim 8 wherein said process is conducted at a temperature varying from about −30 to −10° C.

10. The process of claim 9 wherein R is selected from the group consisting of hydrogen and alkyl radicals having from 1 to 18 carbon atoms.

References Cited

UNITED STATES PATENTS 3,468,925   9/1969   Brois _____ 260—453

FOREIGN PATENTS 718,063   11/1954   Great Britain _____ 260—455
893,795   10/1953   Germany _____ 260—455

OTHER REFERENCES

Powers et al.: "J. Amer. Chem. Soc.," vol. 78, pp. 907–911 (1956).

LEWIS GOTTS, Primary Examiner

G. HOLLRAH, Assistant Examiner

U.S. Cl. X.R.

260—239, 501.21, 583